United States Patent
Schenck et al.

[11] Patent Number: 6,089,600
[45] Date of Patent: Jul. 18, 2000

[54] INTEGRAL GAS DIRECTION DEVICE FOR AN AIR BAG

[75] Inventors: Michael Allen Schenck, Miamisburg; Pamela J-M Bader, Kettering, both of Ohio

[73] Assignee: General Motors Corporation, Detroit, Mich.

[21] Appl. No.: 09/160,108

[22] Filed: Sep. 24, 1998

[51] Int. Cl.[7] .................................................. B60R 21/28
[52] U.S. Cl. ........................................... 280/740; 280/742
[58] Field of Search .................................... 280/740, 741, 280/742, 743.1, 731, 736, 728.1

[56] References Cited

U.S. PATENT DOCUMENTS

| | | | |
|---|---|---|---|
| 5,529,332 | 6/1996 | Wipasuramonton | 280/740 X |
| 5,542,692 | 8/1996 | Shaklik et al. | 280/740 X |
| 5,720,493 | 2/1998 | Sugiyama et al. | 280/731 |
| 5,762,360 | 6/1998 | Damman et al. | 280/728.2 |
| 5,826,901 | 10/1998 | Adomeit | 280/731 X |
| 5,836,608 | 11/1998 | Soderquist et al. | 280/740 X |
| 5,860,672 | 1/1999 | Peterson | 280/740 X |
| 5,904,366 | 5/1999 | Nishijima et al. | 280/731 X |

OTHER PUBLICATIONS

U.S. application No. 09/154,068, Holmes et al., filed Sep. 16, 1998.

Primary Examiner—J. J. Swann
Assistant Examiner—F. Zeender
Attorney, Agent, or Firm—Kathryn A. Marra

[57] ABSTRACT

An air bag has a cushion which is inflated by a gas which is generated in an inflator. The gas has a high velocity and temperature. An integral gas direction device or strap is incorporated in a driver side air bag. The gas direction device is formed in a retainer plate to which the inflator is secured. The gas direction device has a dome top and two upstanding side walls which partially surround the inflator. The side wall and dome top direct the high velocity heated gas generated in the inflator to control the impact of the gas on the cushion. The strap will also restrict the gas deployment of the cushion toward the vehicle operator.

6 Claims, 3 Drawing Sheets

INTEGRAL GAS DIRECTION DEVICE FOR AN AIR BAG

TECHNICAL FIELD

This invention relates to air bags and more particularly to structures for directing gas flow within such devices.

BACKGROUND OF THE INVENTION

Air bags are used in passenger vehicles for protection of occupants. The air bag has a folded bag disposed in a housing on a vehicle component such as the steering wheel. The bag is rapidly inflated with a gas when vehicle sensors indicate a predetermined set of conditions.

The bag in the steering wheel is inflated to cushion the force of the impact and thereby protect the operator. The rate of bag deployment is preferably controlled to establish a desired or acceptable occupant deceleration.

SUMMARY OF THE INVENTION

It is an object of the present invention to provide an improved air bag having a structure for directing the gas flow from an inflator into a gas bag.

In one aspect of the present invention, a gas direction device has a dome top and two upstanding side walls for affecting the direction of gas exiting from an inflator. In another aspect of the present invention, the dome top is disposed above the inflator and the side walls are disposed in parallel relation with a portion of the inflator.

In yet another aspect of the present invention, the gas direction device is formed integrally with a retainer plate of the air bag. In still another aspect of the present invention, the gas direction device is positioned to restrict the gas deployment toward the occupant of the vehicle.

The present invention is incorporated in an air bag module as an integral component. The air bag module includes an inflator, a retainer plate, a base plate, a cushion retainer and a bag or cushion. These components are secured together and, along with a cover, are assembled in the steering wheel of a passenger vehicle. If inflation of the bag is necessary, it expands from the center of the steering wheel toward the operator. A gas flow direction device is integrally formed in the retainer plate to which the inflator is secured.

The gas direction device is in the form of a strap overlapping a major portion of the inflator. The gas expanding from the inflator is influenced in speed and direction by the gas direction device. The gas flow is restricted and the deployment of the bag is thus affected. The reduced gas flow and direction thereof restricts the deployment toward the operator.

DESCRIPTION OF AN EXEMPLARY EMBODIMENT

Figure 1:
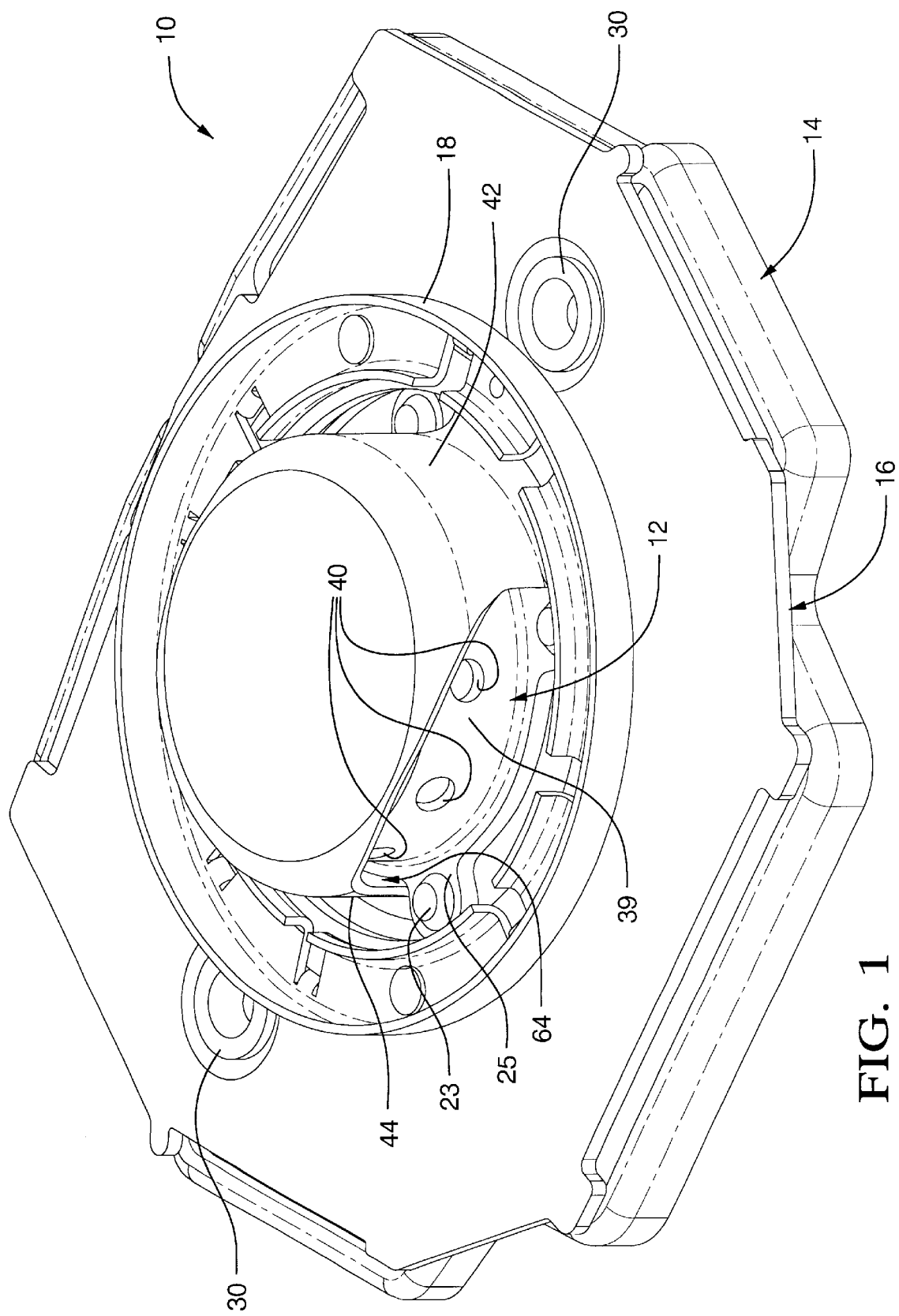
FIG. 1 is an isometric view of an air bag incorporating the present invention.
Figure 2:
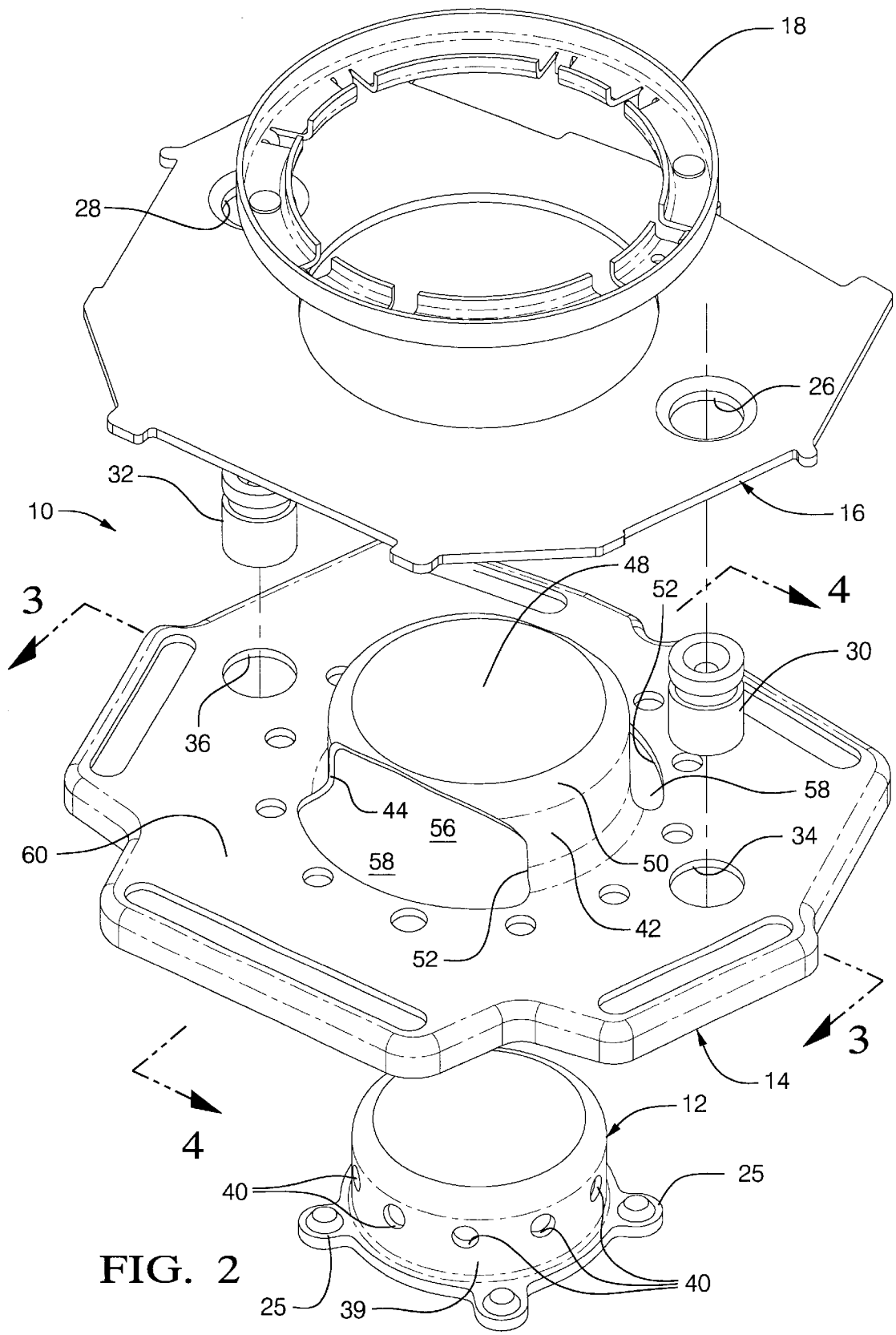
FIG. 2 is an exploded view of the air bag shown in FIG. 1.
Figure 3:
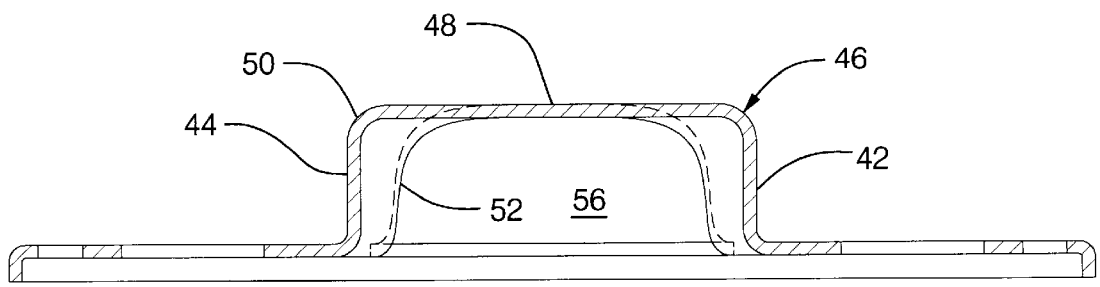
FIG. 3 is a view taken along line 3—3 in FIG. 2.
Figure 4:
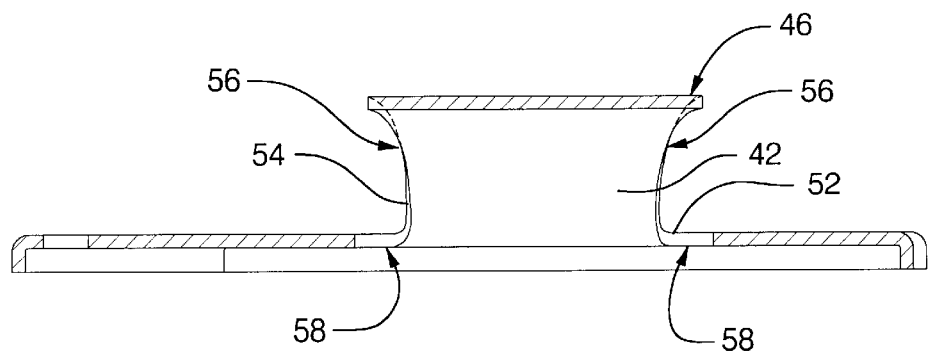
FIG. 4 is a view taken along line 4—4 in FIG. 2.
Figure 5:
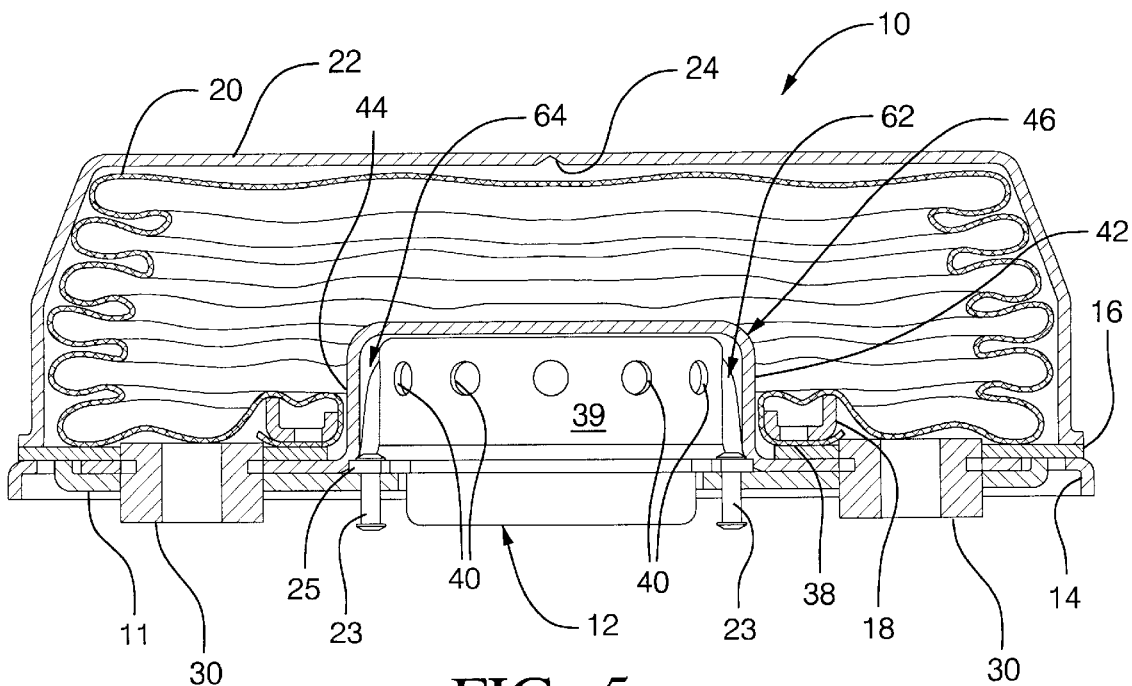
FIG. 5 is a sectional elevational view of the air bag with the cover installed.

An air bag module 10 is adapted in the steering wheel of a passenger vehicle, not shown. The air bag module 10, as seen in FIGS. 1,2 and 5, includes a support plate 11 an inflator 12, a retainer plate 14, a base plate 16, a cushion retainer 18, a bag or cushion 20, and a cover 22. The inflator 12 is secured to the support plate 11 by conventional fasteners such as rivets 23 passing through ears 25 formed on the inflator 12. The ears 25 can be made larger to overlap the retainer plate 14 such that the support plate 11 becomes unnecessary and can be eliminated.

The inflator 12 is a conventional gas generator that provides a high velocity, high temperature gas to inflate the cushion 20 and provide protection for a vehicle occupant. Conventional electronic controls determine the proper time to actuate the inflator 12 and deploy the cushion 20. The cover 22 has parting lines or separating areas 24 which allow the cushion to expand through the cover 22 during deployment.

The base plate 16 has two openings 26, 28 in which respective bushings 30, 32 are installed. The bushings 30, 32 extend through respective openings 34, 36 formed in the retainer plate. The bushings 30, 32 are fitted on and retained by pins, not shown, which are components in the steering wheel assembly of the vehicle. The pins establish the alignment and positioning of the air bag module 10 relative to the vehicle operator.

The cushion ring 18, base plate 16 and retainer plate 14 are secured together by fasteners, not shown. An edge 38 of the cushion 20 is securely held between the base plate 16 and the cushion ring 18. The cushion 20 is folded in the space between the base plate 16 and the cover 22 in preparation for deployment should it be needed.

The inflator 12 has a circumferential wall 39 in which plurality of openings 40 are formed. The gas stream is emitted through the openings 40 to deploy the cushion 20. Some of the openings 40 are restricted by a pair of side walls 42, 44 of a gas flow direction structure or strap 46 which is formed integrally with the retainer plate 14. The side walls 42, 44 each have a length which extends along a portion of the circumferential wall 39 of the inflator 12. The strap 46 has a circular dome top 48 and a curved descending wall 50 formed integral with the side walls 42, 44. Gas egress passages 52, 54 are formed by the removal of metal between the side walls 42, 44. Each passage 52, 54 has a substantially rectangular area 56, between the side walls 42, 44, and an arcuate segmental area 58 formed in a planar surface 60 of the retainer plate 14.

The top 48 of the strap 46 prevents direct upward flow of the as emitted by the inflator 12. The side walls 42, 44 prevent the direct outward flow of the gas emitted by the inflator 12. The egress passages 52, 54 permit the flow of gas from the inflator 12 into the cushion 20. The gas which impinges on the top 48 and side walls 42, 44 is also directed to flow through the passages 52, 54. The gas being redirected into spaces 62, 64 between the side walls 42 and 44 respectively is in a stream substantially perpendicular to the gas stream emitted directly from the openings 40 into the passages 52, 54. This interaction of the gas streams affects the direction and speed of the total gas stream being emitted into the interior of the cushion 20.

The spaces 62, 64 established by the distance between the side walls 42 and 44 have a significant effect on the size and volume of gas stream flowing perpendicular to the gas stream emitted directly from the openings 40. The length of the side walls 42, 44 also effects the resulting gas stream. By increasing the length of the side wall 42, 44 , the spaces 62, 64 are made smaller resulting in an increased amount of perpendicular gas flow and a reduction in the amount of direct gas flow. Also a widening of the spaces 62, 64 increases the perpendicular gas flow volume. These factors, side wall length and spacing, can be utilized to tune the gas flow and therefore cushion deployment.

The strap 46 is depicted in the above described embodiment as being integral with the retainer plate 14. This is an expedient method of manufacture. The strap 46 can be formed as a separate component held in position about the inflator 12 by securement with conventional fasteners to one of the members of the air bag module or the strap 46 can be formed integrally with any of the components of the air bag module 10. This further enhances the flexibility of the strap 46 to fine tune the cushion deployment.

What is claimed is:

1. An air bag comprising: a cushion; a gas generating inflator having a plurality of openings for emitting a gas stream into said cushion; and a gas flow directing apparatus having a single pair of diametrically opposed upstanding side walls, a top portion and a single pair of diametrically opposed gas flow passages between said side walls and aligned with a first portion of said plurality of openings for allowing unobstructed flow of a first gas stream from said inflator, said side walls being spaced from said inflator and positioned to intercept and redirect a second gas stream from a second portion of said plurality of openings into said first gas stream at a substantially perpendicular orientation, and each of said side walls intercepting and redirecting gas flow from at least two openings.

2. The air bag module defined in claim 1 further comprising a retainer plate and a cushion ring, said cushion being retained between said retainer plate and said cushion ring and said gas flow directing apparatus being formed integrally with said retainer plate.

3. An air bag comprising: a cushion; an inflator means for generating a gas stream for inflating said cushion; and a gas flow directing device having a single pair of diametrically opposed spaced upstanding side walls extending along a portion of a circumferential wall of said inflator means, the gas stream being emitted through a plurality of openings in said circumferential wall, a first portion of said gas stream being emitted without obstruction through a first portion of said plurality of openings toward an interior portion of said cushion, a second portion of said gas stream being emitted through a second portion of said plurality of openings into a space defined between said upstanding side walls and said circumferential wall, said second portion of said gas stream being intercepted and redirected by said side walls to enter said first gas stream at a substantially perpendicular orientation, and each of said side walls intercepting and redirecting gas flow from at least two openings.

4. The air bag module defined in claim 3 wherein gas egress passages are defined between said upstanding walls through which the gas stream passes after said second portion of said stream has at least partially entered said first portion of said gas stream.

5. The air bag module defined in claim 4 wherein said egress passages are aligned with said first portion of said gas stream.

6. The air bag module defined in claim 5 further comprising a retainer plate and a cushion ring, said cushion having an edge retained between said retainer plate and said cushion ring and said gas flow directing device being formed integrally with said retainer plate.

\* \* \* \* \*